United States Patent
Vogedes et al.

(10) Patent No.: US 7,792,544 B2
(45) Date of Patent: Sep. 7, 2010

(54) METHOD AND APPARATUS FOR DISABLING THE USER INTERFACE OF ELECTRONIC DEVICES

(75) Inventors: Jerome O. Vogedes, Milwaukee, WI (US); Balakumar Jagadesan, Glendale Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 703 days.

(21) Appl. No.: 11/753,990

(22) Filed: May 25, 2007

(65) Prior Publication Data

US 2008/0290985 A1 Nov. 27, 2008

(51) Int. Cl.
*H04M 1/00* (2006.01)
(52) U.S. Cl. .................. 455/550.1; 455/556.2; 345/168
(58) Field of Classification Search ......... 455/410–411, 455/418–420, 550.1, 556.2, 566; 345/168–169, 345/175; 348/14.01–14.04
See application file for complete search history.

(56) References Cited

U.S. PATENT DOCUMENTS

| 4,670,747 | A | 6/1987 | Borras et al. |
| 5,241,583 | A | 8/1993 | Martensson |
| 5,864,765 | A | 1/1999 | Barvesten |
| 6,449,492 | B1 | 9/2002 | Kenagy et al. |
| 7,076,268 | B2 | 7/2006 | Blacklock et al. |
| 2005/0116840 | A1* | 6/2005 | Simelius ................ 341/22 |
| 2007/0099574 | A1* | 5/2007 | Wang ................ 455/67.11 |
| 2007/0161410 | A1* | 7/2007 | Huang et al. ........... 455/565 |

FOREIGN PATENT DOCUMENTS

| KR | 1020000044459 A | 7/2000 |
| KR | 1020060080060 A | 7/2006 |

OTHER PUBLICATIONS

"Motomanual", Motorola Q CDMA English, Verizon Wireless User Manual, 248 pages.

* cited by examiner

*Primary Examiner*—Kamran Afshar
(74) *Attorney, Agent, or Firm*—Sylvia Chen (57) ABSTRACT

A method and apparatus for an electronic device (100) monitors one or more inputs to the device, such as a transition in sensed ambient light (170) and key press sequences (180), to determine when to lock the device (100). The device memory (155) may include a matrix (or dictionary or rules) of valid, questionable, and invalid inputs that may be updated from time to time. When a questionable input is received, the device (100) notifies a user to enter an exit trigger, such as a MENU * key sequence, or else the phone will be locked. By using a variety of factors to discern questionable inputs and by presenting an exit trigger upon receipt of a questionable input, the electronic device will not lock when a user enters the exit trigger after a questionable input but will lock otherwise.

20 Claims, 5 Drawing Sheets

| CURRENT OPERATIONAL MODE (410) | LIGHT SENSOR (420) | KEY PRESS SEQUENCE (430) | HYPOTHESIS (440) |
|---|---|---|---|
| HOME | LIGHT | #####CALL/ON | VALID |
| CAMERA | LIGHT | #####CALL/ON | QUESTIONABLE |
| HOME | DARK | ######## | QUESTIONABLE |
| CAMERA | EITHER | #⊙##(END)(PAUSE) | QUESTIONABLE |
| BROWSER | EITHER | ⌂⌂⌂ | QUESTIONABLE |
| PHONE | DARK | ● ● ● ● | QUESTIONABLE |

METHOD AND APPARATUS FOR DISABLING THE USER INTERFACE OF ELECTRONIC DEVICES

FIELD OF THE INVENTION

The present invention relates generally to the user interfaces of electronic devices and the "locking," or disabling, of those devices to limit power drain and to prevent unwanted or inadvertent activity with such devices.

BACKGROUND

Mobile electronic devices, such as wireless telephones, include user interfaces that have both input and output apparatuses. Input apparatuses permit a user to input information, such as data or commands, to the electronic device and may include keypads, or voice input devices, for example. Output apparatuses allow a mobile device to provide the user with information by displaying information on a display, such as a liquid crystal display, for example, by announcing information using the device's speaker, or by flashing a light emitting diode (LED).

The power available to a mobile electronic device is always limited, and sometimes critically so. In order to "preserve charge," many schemes have been employed, to greater or lesser success. Some of those schemes attempt to limit the power consumption of mobile devices during periods of relative inactivity. For example, many mobile devices allow a user to manually lock the device's keypad when the device is not going to be in use, so that power is not expended on backlighting a display, inadvertent key presses are not misinterpreted as a desired dialing sequence, or applications are not unintentionally launched. By locking the keypad we mean, simply, that input from the keypad is ignored. Unfortunately, manual locking is somewhat inconvenient and easily overlooked. As a result, precious battery power is often needlessly and uselessly dissipated, inadvertent key presses are misinterpreted as dialing sequences, and application software programs are unintentionally launched.

To overcome the inconvenience of manually locking a device, some electronic devices employ an auto-locking scheme whereby the device is automatically locked after a predetermined period of inactivity. Unfortunately, this approach introduces its own inconvenience because inadvertent key presses, caused by jostling the device within a backpack for example, prevent locking and may also unintentionally launch applications or functions. A convenient way to disable a user interface and thereby prevent unnecessary power consumption or the recognition of inadvertent key presses would be particularly useful.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

A mobile electronic device in accordance with the principles of the present invention employs an apparatus and method that monitors one or more inputs, such as a transition in sensed ambient light and key press sequences, to determine when to lock the device. The validity of inputs may be determined, all or in part, for example, by the timing of the key presses. The timing may include the duration and time between key presses, for example. Additionally, inappropriate key presses in a given context, such as the appearance of softkeys in a dialing pattern, may help to determine whether inputs are valid, questionable, or invalid. If there are questionable inputs, the device notifies a user to enter an exit trigger, such as a MENU * key sequence, or else the phone will be locked. By using a variety of factors to discern questionable inputs and by presenting an exit trigger upon receipt of a questionable input, the electronic device will not lock when a user enters the exit trigger after a questionable input but will lock otherwise.

Thus, a user no longer needs to manually lock the electronic device to avoid inadvertent dialing or launching of applications. Instead, if there is a questionable input, such as a single key being repeatedly pressed when the phone is in low ambient light conditions, the exit trigger will be presented, and if the exit trigger is not entered within a predetermined time period then the phone will lock. Such as scenario can easily be imagined when a user places a mobile phone in a pocket, purse, or backpack. When the user wants to use the mobile phone, a press of any key can result in a transient message displaying the "unlock" key sequence.

Locking could be implemented at a number of different levels. For example, locking may involve cutting power to various components, such as a display's backlight, to prevent wasteful power drain. Locking could be as simple as blocking response to all key inputs until the device is manually unlocked, thereby preventing inadvertent launching of built-in functions, application software programs, or making unwanted calls. Or, locking the device may entail blocking the operation of one or more specific functions, such as dialing, a camera function, or one or more game-related functions, for example.

By discerning questionable inputs and locking an electronic device if an exit trigger is not entered within a predetermined time period after a questionable input was received, the device can lock without inadvertent key presses wasting power (e.g., unintentional dialing, unneeded display backlighting, or mistaken launching of applications), can lock without requiring a manual lock entry, and can also lock without requiring a period of inactivity.

Figure 1:
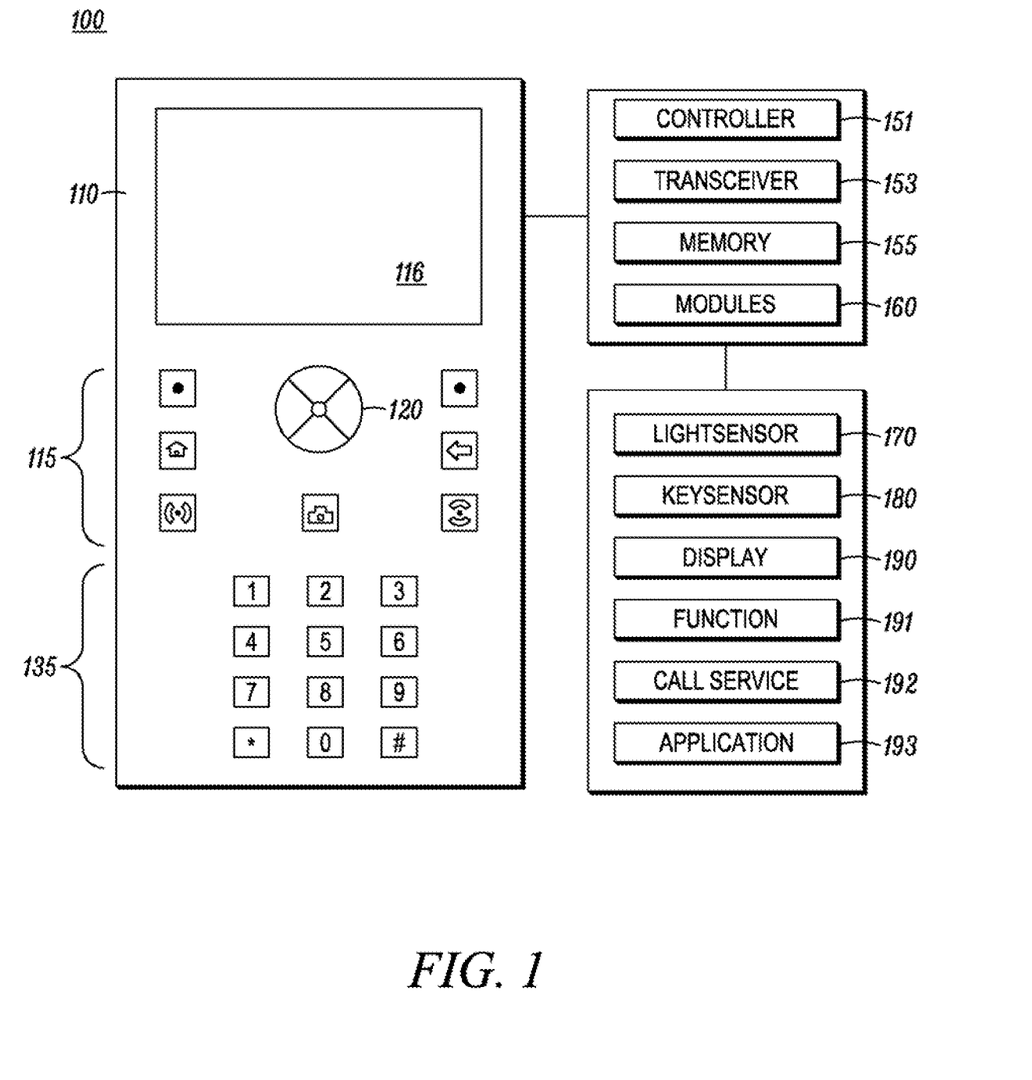
FIG. 1 is an example mobile electronic device in accordance with some embodiments of the invention.

FIG. 1 shows an embodiment of an electronic device 100. Although the electronic device shown is a wireless telephone, the electronic device could be implemented as a two-way radio, a messaging device, a personal digital assistant, a portable computer, an electronic toy or game console, a cordless telephone, a remote controller, or another type of electronic device. Also, although the electronic device shown has a candy-bar form factor (that is, the device employs a single housing, with all keys permanently exposed), the electronic device could alternately have a clam shell form factor, a rotator form factor, a tri-fold wallet form factor, or a slider form factor, for example.

The device 100 includes a housing 110 which supports a first set of keys 115 and a second set of keys 135 as input apparatuses. While the first set of keys 115 is depicted as two soft keys (shown with dots), a navigation key cluster 120, and four function keys (shown with menu-home, go-back, on, and off icons), and the second set of keys 135 is depicted as a 12-key keypad, it is understood that the sets of keys 115, 135 may take various forms depending on the implementation. In this illustrative embodiment the electronic device 100 includes a thin-film liquid crystal display 116 and a backlight for that display (not shown) as an output apparatus. The keys may be implemented as standard popple-dome-switch keys, as touch sensitive keys, or keys that employ other technologies. Keys employing a touch sensitive surface may be implemented using resistive, inductive, or capacitive touch-sensitive surfaces, for example.

In this illustrative embodiment, the electronic device 100 includes a controller 151, a transceiver 153 for wireless communications with a compatible communication device (not shown), at least one memory 155, and various modules 160. The memory 155 may include a combination of volatile and nonvolatile memory technologies, including, but not limited to, read only memory, static memory, electrically programmable read only memory, dynamic random access memory, nor flash memory, nand flash memory, or phase-change memory, for example. The modules shown 160 include: an ambient light sensor module 170, key sensor module 180, a display module 190, a function module 191, a call service module 192, and an application module 193.

The modules 160 carry out processes that will be described in the discussion related to subsequent figures. The modules 160 can be implemented in software (such as in the form of one or more sets of pre-stored instructions) and/or hardware, which can facilitate the operation of the electronic device 100 as discussed below. The modules 160 may be installed during manufacture of the electronic device 100 or can be installed after distribution by, for example, a downloading operation.

The ambient light sensor module 170 operates in conjunction with a light sensor to provide an indication of the flux of light impinging upon the device 100. The module 170 may, for example, poll a photosensor and store a value corresponding to that flux level. One or more values may be stored and values may be averaged over a period of time or otherwise processed to eliminate transient values. Additionally, the module may establish threshold levels, time periods, and times of day to determine the extent to which the ambient light level has changed and whether that change may be of an extended nature. A dramatic change in ambient light level for an extended period of time may indicate that the device has been placed in a purse, a briefcase, a gym bag, a pocket, or some other enclosure and, consequently, it may be advantageous to lock the device to prevent unwanted current drain or inadvertent activity. The term "ambient light level" or, simply, "light level" will be used hereinafter to refer to both a specific level of electromagnetic flux and to transitions in such levels of flux. Those skilled in the art will determine from the context which usage is intended.

The key sensor module 180 reacts to input from any of the various soft, function, navigation, or alphanumeric keys, such as the keys of key sets 135 and 115. In this illustrative embodiment, the module 180 employs the controller 151 to poll the keys to determine whether a key has been activated (by depressing the key, for example). Alternatively, the key sensor module 180 could be interrupt-driven, for example. The key sensor module 180, as will be described in greater detail in the discussion related to FIG. 3, also makes a determination as to whether a key activation or series of key activations are valid.

The display module 190 controls the visual aspect of the user interface of the electronic device 100, including the content displayed on the display 116 and the level of illumination provided by the backlight (not shown) of the display 116. The backlight is operated by the display module 190 to optimize the visibility of the display 116 in various ambient light situations. The backlight consumes a significant amount of power and is typically only turned on to the lowest level that adequately addresses the ambient light situation.

The function module 191 responds to input from function keys once the key sensor module 180 passes along its determination as to whether a valid key activation or sequence of activations has been received. The function module 191 may launch and control functions such as the activation and use of a device's built-in camera (not shown), for example.

The call service module 192 operates in concert with the transceiver 153 and other components to initiate, receive, and carry on wireless telephone calls. The content of those calls may be voice or data, for example. Similarly, the application module 193 operates with the controller 151 and other components and modules, to implement application software programs that might include games, address book, calendar, or any number of applications such as may be found on smart phones, personal digital assistants, or portable computers, for example.

Figure 2:
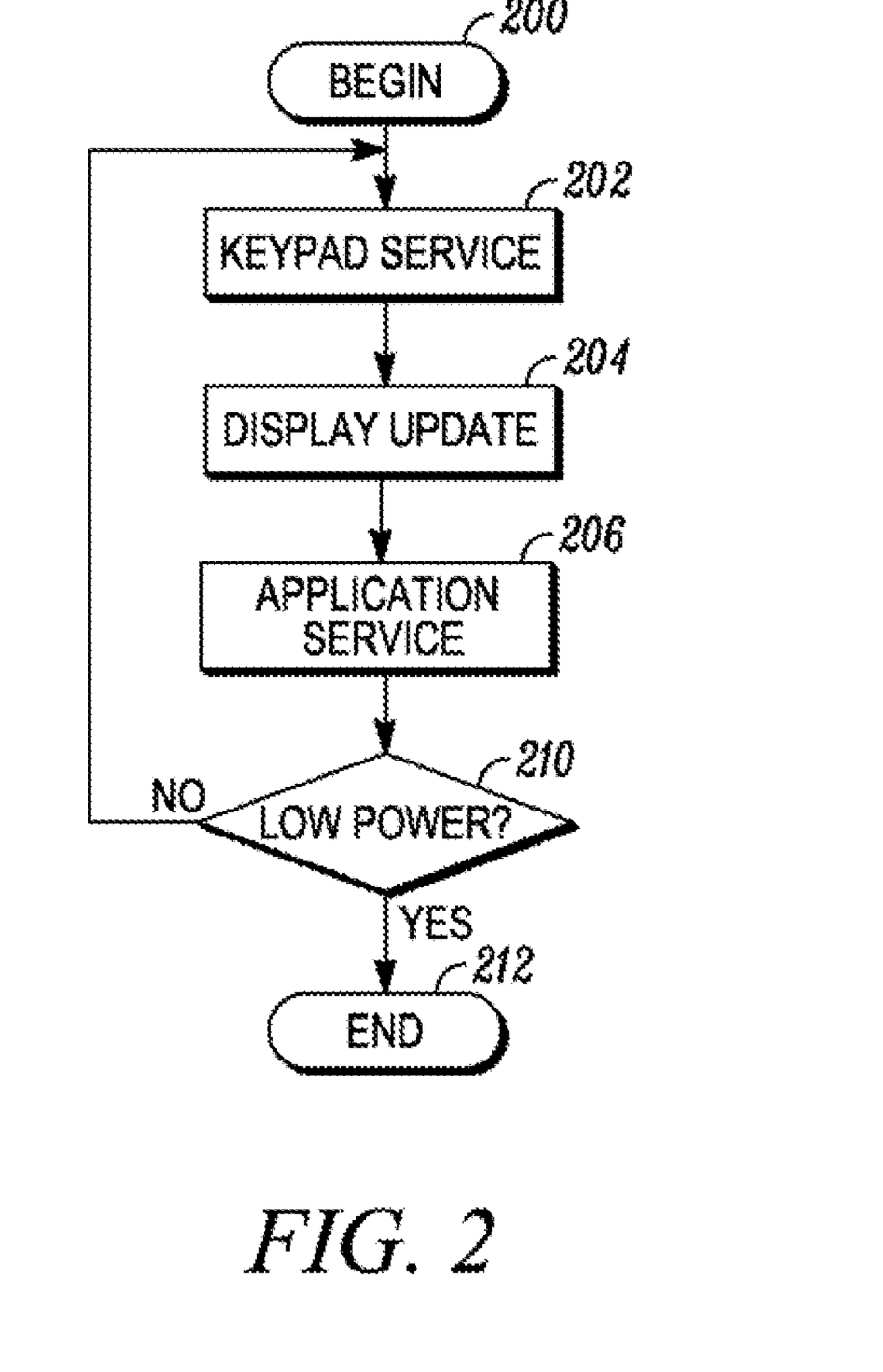
FIG. 2 is an illustrative flow chart depicting the overall operation of a mobile electronic device in accordance with the principles of the present invention.

The flow chart of FIG. 2 illustrates the overall operation of the electronic device 100. In this illustrative embodiment, the device continuously cycles through a "main loop" to service various functions and applications. The process begins in step 200 and proceeds to step 202, where the device enters a keypad servicing loop. In this loop, described in greater detail in the discussion related to FIG. 3, the controller 151, in conjunction with the key sensor module 180, polls the device's various keys, including function, navigation, soft, and keypad keys, located in key sets 115 and 135 to determine whether a key had been activated. This loop, which forms a part of the user interface, is typically entered on a regular basis, with minimum and maximum time spans set between servicing. Keypad servicing, as well as the operation of other modules described herein, may also be accomplished via an interrupt-driven process or a combination of interrupt-driven and polling techniques.

From step 202 the process proceeds to step 204, where the device 100 enters a display service routine. The display service routine updates the device's display 116 to reflect the most recent activity by a user or by the internal functioning of the device 100. That is, for example, the display 116 may be updated to illustrate that a user has activated a specific key, or the display may be updated to reflect the changes in a game being played on the device. Additionally, the display backlight level can be changed (from turning off the backlight to a maximum illumination) or the display can be turned off completely. The display service routine may be carried out, in large part, in the background by a graphics processor that is separate from the device's main processor. In this illustrative example, such a graphics processor would be considered a component of the controller 151.

After exiting the display service routine 204 the process proceeds to step 206 where it enters a function and application service routine. In this illustrative embodiment, all the mobile electronic device's built-in functions and applications are serviced in this routine. In this context, we define a function as a built-in feature of the device that may be accessed relatively immediately by dedicated keys, keypad entry, or menu selection, for example. Call servicing and camera operation are examples of what we mean by functions. Applications may be less immediately available to a user and may require a user to access multiple layers within a user interface in order to activate the application software programs. Examples of application software programs include games and web browsers, for example. In this routine, the controller 151 operates with components including the transceiver 153 to establish and terminate calls. The calls may be incoming or outgoing and may include voice or data traffic. Camera and other built-in functions may also be serviced here. Additionally, application software programs such as games, streaming video, slide show presentations, a word processor, or a spreadsheet program, for example, may be serviced in this routine. Once initiated in this loop, such applications may operate in a background mode and may employ dedicated processors, such as graphics or math processors, which are considered to be components of the controller 151 in this illustrative embodiment.

After exiting the applications service routine 206 the process proceeds to step 210 where the controller 151 determines whether the electronic device 100 should enter a low power mode of operation. This determination may be made on the basis of a lack of activity, for example, and may entail varying levels of residual activity. One or more processors that form the core of the controller 151 may, for example, enter a "sleep mode" whereby all functions other than basic clocking and interrupt servicing are suspended to conserve energy. If the controller 151 determines in step 210 that it is to enter the low power mode, the process proceeds to end in step 212. The low power mode of operation may also entail "locking" the user interface to prevent inadvertent inputs such as one or more key presses from affecting the electronic device's operation. In this step the controller 151 operates in standby to respond to an incoming call, for example. If, in step 210 the controller 151 determines that it will not enter the low power mode, the process returns to step 202 and proceeds from there as just described.

Figure 3:
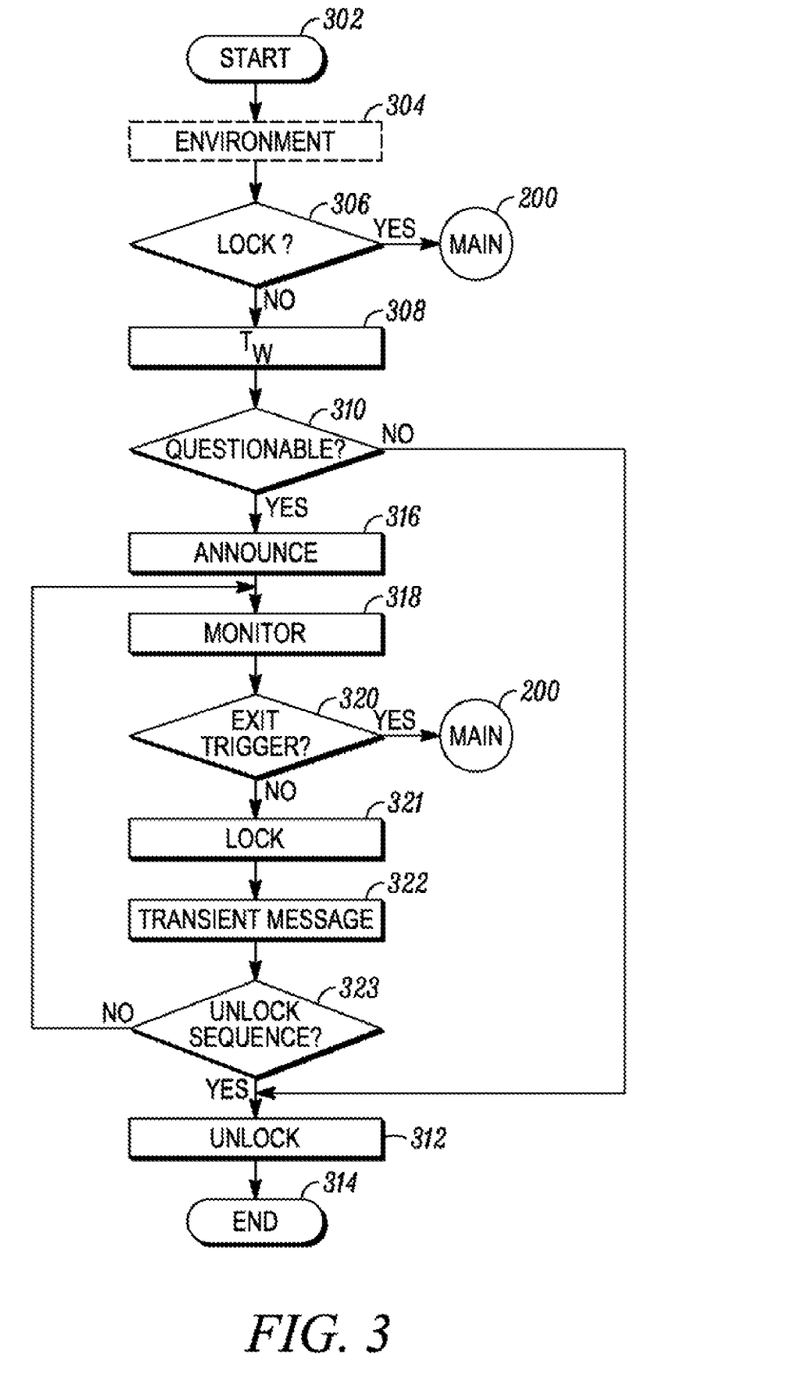
FIG. 3 is an illustrative flow chart providing a more detailed exposition of the operation of a mobile electronic device in accordance with the principles of the present invention, with a particular focus on the locking of such a device.

The flow chart of FIG. 3 illustrates the process flow for a mobile electronic device in accordance with the principles of the present invention whereby the device, in conjunction with modules and processes previously described, determines whether to lock itself in order to prevent unnecessary current drain, the inadvertent launching of applications or functions, or unintentional dialing, for example. In an illustrative embodiment, the process for determining whether to lock or not may be contained wholly or in part within the step 210 of FIG. 2. The locking process may be implemented at various levels. At one level the process may allow one or more functions to continue operating while others are locked out. At another, more complete, level of locking, one or more additional (or substitute) functions or processes may be locked. At still higher levels of locking, those additional (or substitute) functions or processes may be locked.

The process 300 begins in step 302 and proceeds from there to optional step 304 where the controller 151 attempts to discern from its environment whether it is likely that it should place the device 100 in a locked state. The controller 151 may employ the ambient light sensor module 170, for example, to determine whether there has been a recent significant transition in ambient light levels. The ambient light module 170 may typically be employed to adjust the backlight level of one or more keys in the key sets 115 and 135 or the backlight level of the display 116 in order to provide improved viewing in various ambient light environments. In accordance with the principle of the present invention, in addition to, or in place of, that function, the ambient light module 170 may be employed to sense when the device 100 is placed in a position where a user may no longer intend to use the device. For example, if the ambient light level drops a predetermined amount and remains low for a predetermined period, the device may determine that it is in a location where the device's user would not normally be expected to use it. For example, the controller 151 may "assume" that the device 100 is inside a purse, a briefcase, a gym bag, a pocket, or some other such enclosure where a user would not normally be expected to use the device 100.

The light level factor may be set to a specific light-to-dark transition value, for example, or it may be set to an absolute ambient light level. Specific values may vary from application to application and from environment to environment and could vary according to the time of day, day of year, or location (which may be determined, for example using an integral GPS receiver), for example. That is, for example, a low ambient light level at 4:00 PM on December 20 in Fairbanks, Ak. would not necessarily be indicative of the device 100 being placed in a purse, pocket, etc. Sound levels and quality (muffling, for example) may also be employed in accordance with the principles of the present invention to determine whether the device 100 may have been placed in a location in which it is unlikely that a user will make intentional entries in the user interface.

From step 304 the process proceeds to step 306, where the controller 151 determines whether the device 100 is locked. Such device locking may have been accomplished manually, by entry of a key sequence, for example, or may have previously been effected within the current process 300. If the device is locked, the process returns to the main loop 200 and proceeds from there as previously described.

If the device 100 is not locked, the process proceeds to step 308. As will be described in greater detail in the discussion related to FIG. 5, the device enters a semi-locked state at this point. In the semi-locked state, the device's backlight will be lit, and an exit trigger sequence that permits the device to return to the unlocked state will be presented to the user. In step 308, the controller 151 waits for a predetermined period of time Tw. This time period may be selected to be greater than what one would normally expect as the interval between intentional key entries (30 seconds, for example) and a rather lengthy period of time (five minutes, for example) that almost certainly indicates that the device is not actively in use (that is, there is no ongoing user interaction with the device that might be interrupted by locking the device). This intermediate time interval, one minute in an illustrative embodiment, may coincide, for example, with the activity-free time interval at which the device 100 normally enters a low power mode whereby it shuts down power consuming operations, such as backlighting the display 116. Alternatively, or in combination with waiting the predetermined time period Tw, the device may determine that one or more key presses have been entered. In either case, that is, the detection of key press entry or the time period Tw transpiring, the process proceeds from step 308 to step 310.

In step 310 the process determines whether one or more inputs that have been received are of questionable validity. In accordance with the principles of the present invention, the controller 151 may make this determination based on a variety of factors. For example, the controller 151 may include a dynamic list (also referred to herein as a matrix or dictionary) of valid, questionable, and invalid inputs.

Figure 4:
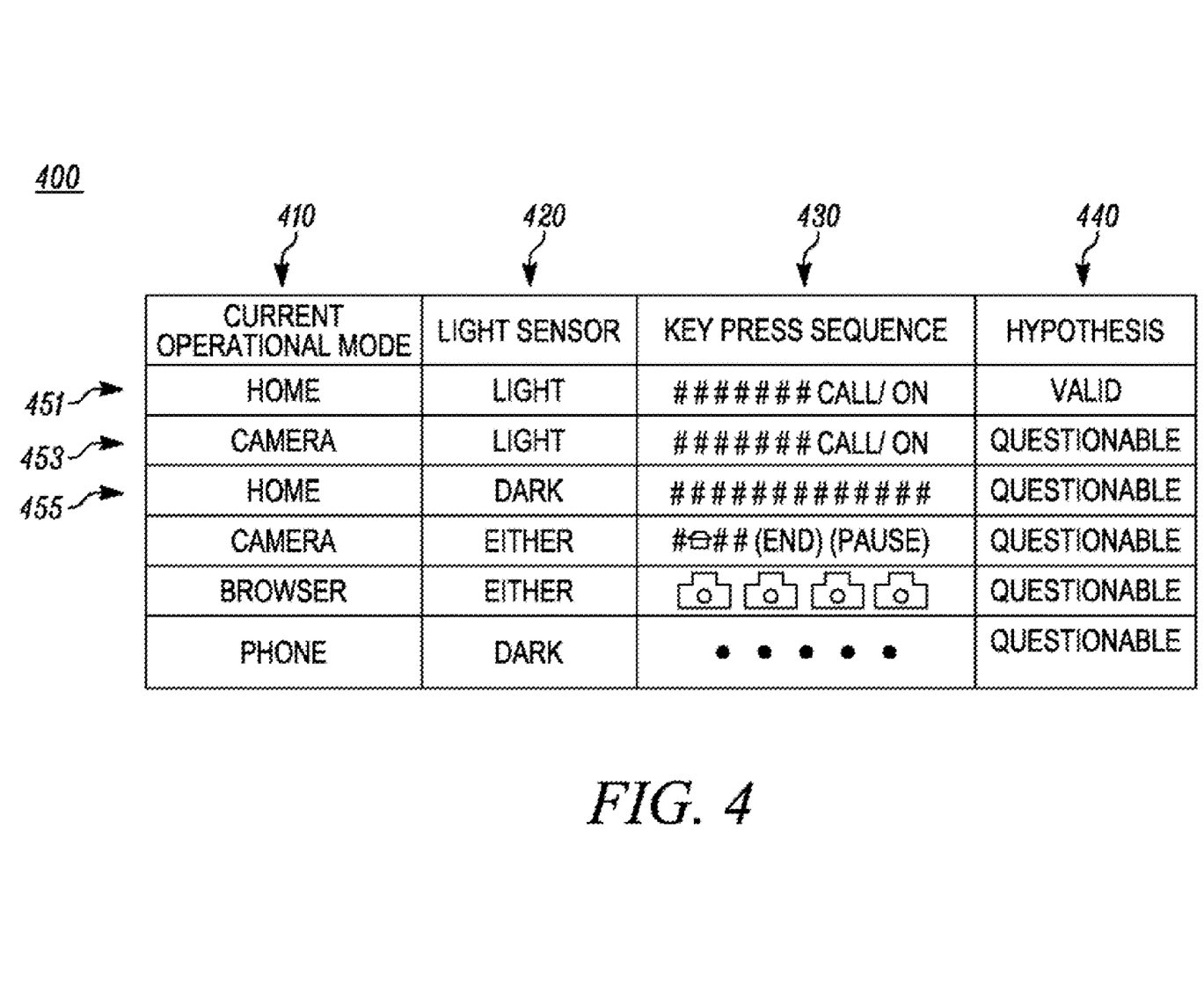
FIG. 4 is a diagram of a validity matrix such as may be employed by a mobile electronic device in accordance with the principles of the present invention.

An illustrative matrix 400 is shown in FIG. 4. Such a matrix may be downloaded in its entirety when the device 100 is first initialized or a core matrix may be included at the point of manufacture. The matrix may be updated by downloading, or the device may "learn" new dictionary entries in the course of performing its regular operations. For example, a user may enter a teaching mode whereby the user can indicate new input combinations and their valid outcomes or the device can constantly be in a teaching/learning mode. In accordance with the principles of the present invention, instead of a matrix or dictionary (or in addition to a matrix or dictionary) a set of logical rules may be employed to hypothesize 440 whether inputs are valid, questionable, or invalid and are therefore candidates for locking. Such rules, matrices, or dictionaries may employ "wild cards," for example, to act as placeholders in the determination of such candidate sequences. In the matrix 400 shown, a "#" character represents a wildcard for any key from the set of keys 135 shown in FIG. 1 and a "e" represents a wildcard for any key from the key sets 115 shown in FIG. 1.

The matrix 400 may include information relating key press sequences 430 to current operational modes 410 to result in a hypothesis 440 of valid, questionable, or invalid. A key press sequence that is a valid input for a voice communication or dialing mode of operation 451 may be a questionable input for a camera mode of operation 453. Similarly, a key press that is part of a valid input for a camera mode of operation may not be part of a valid input for a game mode of operation. Instead of, or in addition to an operational mode 410 factor, the matrix 400 may include a column for application software programs currently running on the device, and/or the current function of the device. For example, if any single key is pressed repeatedly ten times 455 while the device is in "home" mode and the light sensor indicates that the environment is dark, then input is questionable.

The validity of key press sequences 430 in an input may be influenced by a number of factors. For example, a continuously activated key, one or more keys that are activated in too rapid succession (for example, less than half a second between key presses), or one or more keys that are activated between lengthy pauses (pauses greater than thirty seconds, for example) may be indicative of keys being inadvertently depressed by an item inside a pocket, purse, or briefcase. If, in addition, the key press patterns are unrecognizable to the controller 151 or are inconsistent with the current operational mode 410 of the device 100, as indicated, for example, by the matrix 400, the controller may flag the key press or presses as potentially problematic.

Additionally, ambient light levels and light level transitions 420, ambient sound levels and quality (not shown), time of day (not shown), and location (not shown) may be taken into account to determine whether it is likely that any key presses that are entered are intentional. Inputs that have been flagged as invalid in this manner may be put on a fast track for rejection. That is, key press sequences hypothesized as invalid may be given less leeway in the final determination of whether to lock the device 100 and of which level of lock to apply.

In an illustrative embodiment, the controller 151 may await a predetermined number of inappropriate key presses before hypothesizing 440 that a key press sequence 430 is of questionable validity. This approach would allow a user to make an occasional mistaken entry, without the threat of locking the user interface. It should be noted that, whatever level of lock the device proposes in response to whatever invalid input, the device will likely announce to the user that a possibly invalid input stream has been encountered and that the device will lock the user interface unless the user takes appropriate action within a predetermined period of time.

If the controller 151 determines in step 310 that no questionable key entries have been made, the process proceeds to step 312 where the controller maintains the device's unlocked status. From step 312, the process proceeds to end in step 314 and from there, return to the main loop, 200.

If, on the other hand, the controller 151 determines in step 310 that a questionable input has been received, the process proceeds to step 316 where the controller sends a message to the user (this message, this "announcement", could be implemented via sound or display, or both) indicating that, unless corrective action is taken, the device will be locked. In an embodiment, the corrective action is entering an exit trigger as instructed by the message. As previously mentioned, the lock status is described in greater detail in the discussion related to the state diagram of FIG. 5. Stored rules, which may be loaded in the device at the factory and/or downloaded or learned, may make the determination of which level of lock to institute, based on a combination of invalid key sequence and environmental factors. That is, the determination of lock level may be based on factors stored in the matrix previously described.

From step 316 the process moves to step 318 where the controller 151 monitors the user response to the warning of step 316, and other factors contained within the previously mentioned matrix to determine whether to proceed with locking the device. In an illustrative embodiment, an exit trigger to avoid locking the device may be the user pressing a valid keypad entry, pressing a particular key such as backspace (go-back) or key sequence such as MENU *, or stating a particular voice command (e.g., "unlock" or "don't lock"). From step 318 the process proceeds to step 320 where the controller 151 determines whether an event, the exit trigger, has occurred, which satisfies the requirements for unlocking the device or preventing the device from being locked. If such input is received, the process returns to the main loop 200 without locking the device. As previously noted, in a real time implementation, the process may return to the main loop from time to time to process other system functions, but would return to this point in the process until requirements for unlocking the device are satisfied.

When the requirements for avoiding locking are not met, the process proceeds to step 321 where the device is placed in a locked state. This locked state may, for example, be a low-power state. From step 321 the process proceeds to step 322, where the device specifies to the user a key sequence to employ to unlock the device. From step 322 the process proceeds to step 323 where the controller determines whether an unlock sequence has been received. If an unlock sequence has not been received, the process returns to step 318 and from there as just described. If an unlock sequence has been received, the process proceeds to step 312, where the device is unlocked and the process proceeds as previously described. As is known in the art, in a real-time implementation, control would naturally shift in and out of this routine, returning to the main loop to service other modules, both shown and not shown in FIG. 2. For clarity of exposition, such exit points are not shown in the flow chart of FIG. 3. For example, in 308 the process may exit to the main loop and return if there is no activity during the waiting period, Tw. In an illustrative embodiment, this process may be a part of the keypad polling routine and loop back is limited in time. Consequently, information related to locking the device 100 is stored, the routine is exited to service other routines, and information is retrieved upon reentry. This may occur in various locations throughout the process.

A matrix such as illustrated by the block diagram of FIG. 4 may be employed by a mobile electronic device in accordance with the principles of the present invention, a cellular telephone in this illustrative embodiment, to correlate device inputs with device functions. This matrix can be stored in memory 155 of FIG. 1.

The categories across the top of the block diagram include the device's current function, the status of the device's light sensor, a key press sequence and a hypothesis formed by the device's controller in response to the preceding factors. For example, if the device's current function is "Home," the light sensor detects a "normal" light level, and a key sequence of seven numbers, followed by a "call" entry is received, the controller would recognize this sequence as a valid input. On the other hand, if the device's current function is "Home," the light sensor detects a less-than-normal light level and eleven or more numbers are entered without a "call" entry, the controller 151 may mark this sequence as questionable. Similarly, if the device's current function is "Camera," light levels are either high or low, and the input sequence appears random and unrelated to the camera function, the controller 151 may mark this sequence as questionable. If the device's current function is "Browser," light levels are either high or low, and the input sequence is repeated camera function activation inputs, the controller 151 determines that the key sequence is invalid. If the device's current function is "Phone," the light sensor indicates that the environment is dark, and a string of identical soft key inputs are received, the controller 151 would hypothesize that the input string is questionable. As previously described, inputs recognized by the controller 151 as questionable may launch a process whereby the device locks its user interface until an unlocking sequence is entered by the user.

Figure 5:
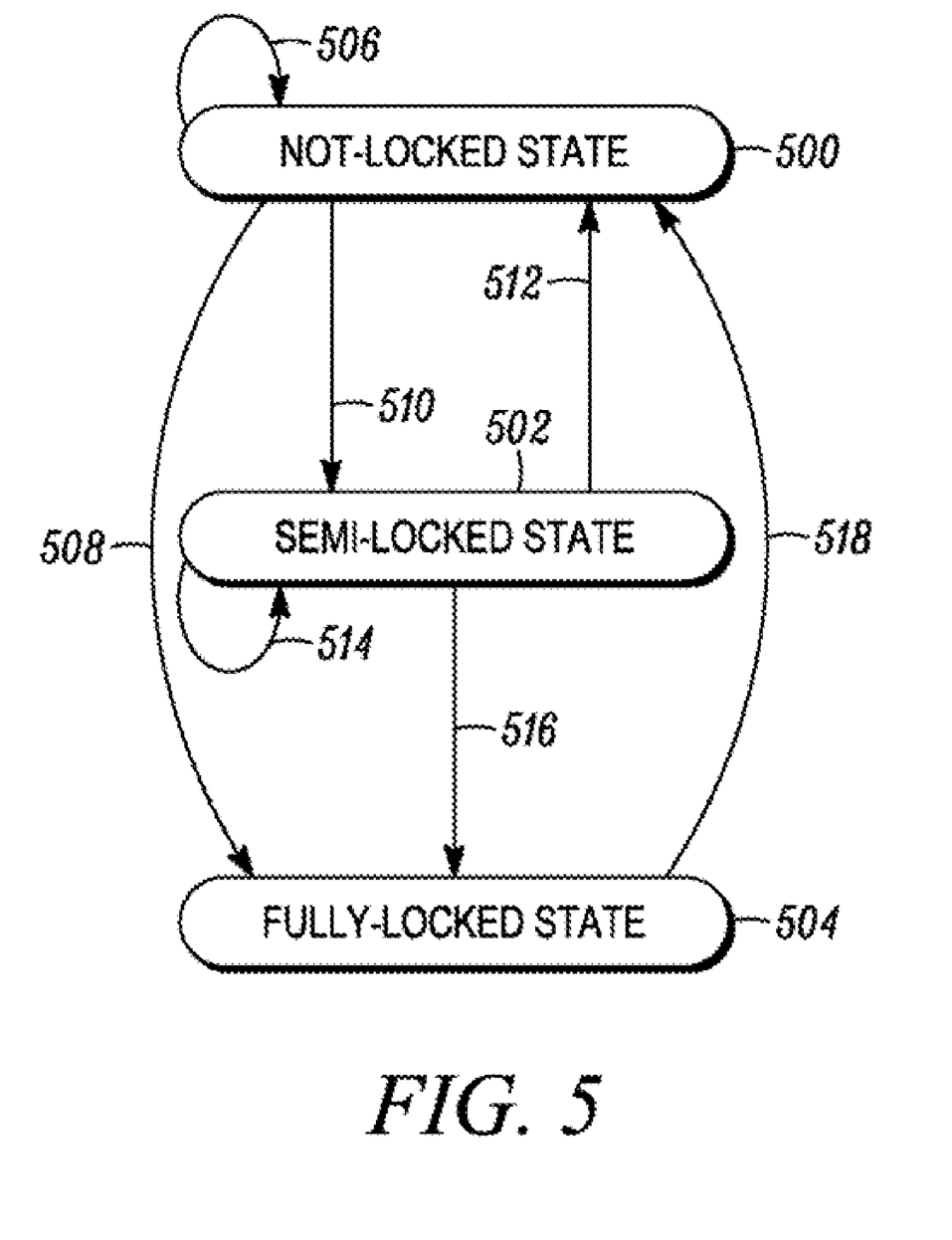
FIG. 5 is a state diagram that illustrates various lock-related states and the transitions between those states in accordance with the principles of the present invention.

The state diagram of FIG. 5 illustrates three lock-related states for an electronic device 100 in accordance with the principles of the present invention. In this illustrative embodiment, the device 100 may be in a not-locked state 500, a semi-locked state 502, or a fully-locked state 504.

In the not-locked state 500, input from the user interface may initiate useful action on the part of the device 100, with the device 100 remaining in the not-locked state, or propel the device, as described in the discussion related to the flow chart of FIG. 3, to the semi-locked state 502 or the fully-locked state 504. In this illustrative embodiment the not-locked state 500, the electronic device 100 accepts input from all keys and operates the display in a normal manner (the backlight is lit, for example). In the semi-locked state 502, all key entries are valid, the display is backlit, and the display presents to the user the option of entering an exit trigger that will return the device 100 to the not-locked state 500. In the fully-locked state 504, not all key inputs are valid, the backlight is not lit, and the device 100 displays a transient message, in response to the depression of a key, for example, indicating to the user the procedure for unlocking the device.

When the device 100 is in the not-locked state, a valid input from the user interface, indicated by transition 506, maintains the electronic device in the not-locked state 500. The validity of an input from the user interface may be determined through use of a validity matrix such as described in greater detail in the discussion related to FIG. 4. An invalid input from the user interface will propel the electronic device to the fully-locked state 504, as indicated by the transition 508. A questionable input from the user interface will change the state of the device from the not-locked state 500 to the semi-locked state 502 via transition 5 10. Illustrative examples of invalid and questionable inputs were presented in the discussion related to FIG. 4.

When the device 100 is in the semi-locked state 502 an exit trigger sequence may take the device 100 to the not-locked state 500, as indicated by the transition 512. An ambiguous key press may return the device 100 to the semi-locked state 502, as indicated by the transition 514. The device 100 may transition from the semi-locked state 502 to the fully-locked state 504 when no exit trigger is received to return it to the not-locked state 500, as indicated by transition 516. This "no-exit-trigger" transition may occur in response to one or more improper key presses or to a timeout, for example.

The device 100 remains in the fully-locked state 504 until a proper unlock sequence is received, at which point the device 100 returns to the not-locked state 500, as indicated by the transition 518.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It should be observed that the embodiments reside primarily in combinations of method steps and apparatus components related to a mobile device that analyzes one or more key presses, transients in ambient light, and/or other factors to initiate or maintain a user interface lock status. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a lock system and method in accordance with the principles of the present invention described herein. The non-processor circuits may include, but are not limited to, a radio receiver, a radio transmitter, signal drivers, clock circuits, power source circuits, and user input devices. As such, these functions may be interpreted as steps of a method to perform the locking of a device's user interface. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

We claim:

1. An electronic device comprising:
a user interface including at least one input apparatus and at least one output apparatus, the at least one input apparatus including input keys;
memory for storing questionable inputs;
a controller configured to monitor the at least one input apparatus and to compare input, received when the electronic device is a not-locked state, with the questionable inputs;
the controller further configured to specify an exit trigger on an output apparatus when the controller discerns the input to be a questionable input and places the electronic device in a semi-locked state; and
the controller is further configured to lock the electronic device to a locked state, if no exit trigger is received after a predetermined time period, wherein locking the electronic device includes disabling the input keys.

2. The electronic device of claim 1 wherein the controller is further configured to store and update information in the memory related to the questionable inputs.

3. The electronic device of claim 1 wherein the questionable inputs include a factor related to one or more operational modes of the electronic device.

4. The electronic device of claim 1 wherein the questionable inputs include a factor related to ambient light levels.

5. The electronic device of claim 1 wherein the questionable inputs include information related to timing of key presses.

6. The electronic device of claim 1 wherein the questionable inputs include information related to one or more application software programs running within the electronic device.

7. The electronic device of claim 1 wherein the questionable inputs include information related to one or more functions built-in to the electronic device.

8. The electronic device of claim 1 wherein locking the electronic device includes not providing power to a backlight.

9. The electronic device of claim 1 wherein locking the electronic device includes preventing launching of one or more application software programs stored in the electronic device.

10. The electronic device of claim 1 wherein the controller is further configured to employ the output apparatus to display a transient message when the controller discerns the input to be a questionable input.

11. The electronic device of claim 1 wherein the memory also stores an unlock sequence and the controller is configured to unlock the electronic device in response to receiving the unlock sequence at the user interface.

12. A method in an electronic device comprising:
storing information in memory related to whether inputs from a user interface are questionable inputs;
monitoring the user interface;
comparing input, received from the user interface when the electronic device is in a not-locked state, with the information;
waiting for an exit trigger while in a semi-locked state when the input is a questionable input; and
locking the electronic device in a locked state, if no exit trigger is received after a predetermined time period.

13. The method of claim 12 wherein storing information comprises:
storing current operational mode information as a factor for the questionable inputs.

14. The method of claim 12 wherein storing information comprises:
storing ambient light level information as a factor for the questionable inputs.

15. The method of claim 14 wherein comparing input comprises:
comparing an output from a light sensor with ambient light level information.

16. The method of claim 12 wherein storing information comprises:
storing key press timing information as a factor for the questionable inputs.

17. The method of claim 16 wherein comparing input comprises:
comparing a time interval between key presses with key press timing information.

18. The method of claim 12 further comprising:
providing exit trigger instructions to a user through the user interface before waiting.

19. The method of claim 12 wherein comparing input comprises:
comparing a current operational mode of the electronic device and a key press sequence to stored information.

20. The method of claim 12 wherein comparing input comprises:
comparing the number of times a key has been pressed in a key press sequence.

* * * * *